United States Patent [19]

Iler

[11] 3,762,936

[45] Oct. 2, 1973

[54] MANUFACTURE OF BOROSILICATE GLASS POWDER ESSENTIALLY FREE OF ALKALI AND ALKALINE EARTH METALS

[75] Inventor: Ralph K. Iler, Wilmington, Del.

[73] Assignee: E. I. du Pont de Nemours and Company, Wilmington, Del.

[22] Filed: Feb. 2, 1971

[21] Appl. No.: 112,007

Related U.S. Application Data

[63] Continuation-in-part of Ser. No. 657,042, July 31, 1967, abandoned.

[52] U.S. Cl. .................................................. 106/54
[51] Int. Cl. ........................... C03c 3/08, C03c 3/04
[58] Field of Search .................. 106/52, 54; 65/30; 23/313

[56] References Cited
UNITED STATES PATENTS

| | | | |
|---|---|---|---|
| 1,091,679 | 3/1914 | Locke | 106/54 |
| 1,526,423 | 2/1925 | Keyes | 106/54 |
| 1,610,182 | 12/1926 | Thomson | 106/52 |
| 2,239,551 | 4/1941 | Dalton et al. | 106/54 |
| 2,973,278 | 2/1961 | Kadisch | 106/54 |
| 3,532,473 | 10/1970 | Biegler | 23/313 |

FOREIGN PATENTS OR APPLICATIONS

| | | | |
|---|---|---|---|
| 425,413 | 1935 | Great Britain | 65/42 |
| 455,460 | 1936 | Great Britain | 65/30 |

*Primary Examiner*—A. B. Curtis
*Assistant Examiner*—Mark Bell
*Attorney*—Norbert F. Reinert

[57] ABSTRACT

An intimate mixture of a boric oxide source compound and colloidally subdivided amorphous silica is slowly heated to evolve all moisture and boric oxide source decomposition products. The mixture is then heated to a final temperature between 500° and 900° C. to form a borosilicate glass powder directly, or to form a borosilicate glass agglomerate which may readily be crushed to a powder.

5 Claims, No Drawings

MANUFACTURE OF BOROSILICATE GLASS POWDER ESSENTIALLY FREE OF ALKALI AND ALKALINE EARTH METALS

CROSS-REFERENCE TO RELATED APPLICATIONS

This application is a continuation-in-part of Ser. No. 657,042 which was filed on July 31, 1967. and now abandoned.

BACKGROUND OF THE INVENTION

This invention relates to the manufacture of borosilicate glass powders which are essentially free of alkali and alkaline earth metals. Such glasses approach fused silica glass in many valuable properties but, unlike fused silica glass, do not rapidly crystallize to crystobalite above 1,200° C. These glasses have very low coefficients of thermal expansion which lead to high thermal shock resistance, and also possess good electrical, weathering, chemical and heat resistance properties.

It is often advantageous to have borosilicate glass of controlled boron content available as a fine powder, for example, in the manufacture of shaped objects by cold pressing the powder and sintering the resulting compact to a high-strength, high density body. Such powders are also useful as high-temperature pressure-transmitting media in the methods disclosed and claimed in my U.S. Pat. No. 3,469,976 entitled "Isostatic Hot Pressing of Metal-Bonded Metal Carbide Bodies."

However, borosilicate glass which has been heated to fusion and ground to a fine powder does not have the plasticity and flow characteristics at 1,000° to 1,200° C. desired in many of these uses. Heretofore, the preparation of borosilicate glass powders essentially free of alkali and alkaline earth metals has been carried out either by fusing a borosilicate glass containing sufficient alkali that it can be fused at less than 1,200°C. in a conventional glass furnace and then removing the alkaline materials with aqueous acid, or by melting boric oxide and pulverized crystalline silica together at a much higher temperature and crushing the resulting glass. Both procedures are difficult and expensive, and the glasses produced are not friable and are thus difficult to grind to a very finely divided state. Prior art methods of making a borosilicate glass from boric oxide and silica powder, such as U.S. Pat. No. 1,526,423, yielded a glass melt rather than a glass powder because the silica powder they used, while fine in the conventional sense, was still too coarse to yield a homogeneous product at temperatures below about 1,200° C.

SUMMARY OF THE INVENTION

By the method of this invention borosilicate glass powder essentially free of alkali and alkaline earth metals is obtained by the reaction of silica and boric oxide in the absence of a fluxing agent, thus eliminating the leaching required by the prior art method. In practicing this invention, an intimate mixture consisting of from 83 to 99.7 percent by weight of colloidally subdivided, amorphous silica and 0.3 to 17 percent by weight of boric oxide are heated to remove essentially all water from the mixture, and then heated to a temperature generally between 500° to 900° C. to form either a borosilicate glass powder directly, or a borosilicate glass agglomerate which may readily be reduced to powder form.

The expression "colloidally subdivided, amorphous silica" as utilized herein and in the appended claims refers to particles of amorphous silica having an ultimate particle diameter of less than 0.50 microns and to layers of amorphous silica which are less than 0.50 microns in thickness. The existence of colloidally subdivided, amorphous silica is readily confirmed by conventional electron microscopic methods for dispersed fine powders.

The expression "borosilicate glass essentially free of alkali and alkaline earth metals" refers to borosilicate glass which contains a maximum of 0.05 percent by weight of alkali and alkaline earth metals. Preferably, the glass contains less than 0.02 percent by weight of these metals. The presence of alkali metals should especially be avoided since they are most effective in causing undesirable devitrification of the glass at elevated temperatures.

DETAILED DESCRIPTION OF THE INVENTION

The present invention is founded on the discovery that intimate mixtures of boric oxide and colloidally subdivided, amorphous silica can be heated to temperatures at which the silica and boric oxide form borosilicate glass without substantial loss of boric oxide from the reaction mixture due to sublimation. Thus a borosilicate glass powder of controlled composition is obtained.

The borosilicate glass powders of this invention are easier to mold at moderate temperatures (1,000° to 1,200° C.) than are prior art borosilicate powders. The reasons for this improvement are not clear, but appear to result from the unique method of preparing the powder.

The amount of boric oxide present in these mixtures can range from about 0.3 percent to about 17 percent by weight. Amounts of boric oxide substantially less than about 0.3 percent are not sufficiently effective as a fluxing agent to provide borosilicates which maintain a useful viscosity over a range of temperatures in the vicinity of 1,600° C. In other words, at less than about 0.3 percent boric oxide the borosilicate approaches too closely the properties of amorphous silica. Conversely, quantities of boric oxide above about 17 percent are difficult to react completely, even with colloidal silica. Furthermore, the softening temperature of such borosilicate glasses would be sufficiently reduced so that they would possess no particular advantages in temperature resistance over conventional alkali or alkaline earth borosilicate glasses.

Silica-Boric Oxide Mixtures

The mixtures of boric oxide and colloidally subdivided, amorphous silica used in the methods of this invention can be prepared by any method which will assure intimate contact between the boric oxide and colloidally subdivided amorphous silica on a molecular or colloidal scale. For example, one of the components can be present in aqueous suspension as particles, while the other is present in molecular form in solution. In this case, upon drying, the material in solution can actually coat the solid particles of the other component.

Alternatively, both of the components can be present as particles and can be mixed by suspension in a liquid or in dry form by using a vigorous blending operation. The colloidal particles of silica can actually form thin layers or coatings around the particles of boric oxide, permitting rapid reaction at low temperatures due to the large surface areas of the two materials in mutual contact.

Suitable silica-boric oxide mixtures can also be prepared by substituting for the silica or the boric oxide or both, in the procedures described immediately above, one or more compounds which are thermally decomposable to silica or to boric oxide and to one or more volatile by-products. The resulting mixtures can be thermally treated to yield the silica-boric oxide mixtures. This thermal treatment can be carried out well in advance of projected use of the mixtures or can be carried out during heat-up to the temperatures used in the method of this invention. Such thermally decomposable compounds are hereinafter referred to as "sources."

As stated above, the borosilicate glasses produced by the method of this invention should contain a total of no more than 0.05% and preferably 0.02% by weight of alkali and alkaline earth metals. Therefore, the silica, boric oxide and sources thereof used in the method of this invention must, of course, contain no more than these percentages of alkali and alkaline earth metals.

Colloidally subdivided, amorphous silica and sources thereof can be obtained commercially or can be prepared in any conventional manner. A preferred silica is supplied as an ultrafine white powder by the Chemical Division of the Pittsburgh Plate Glass Company of Pittsburgh, Pennsylvania under the trade name of "Arc Silica" 800. This material consists of particles having an average ultimate particle size of 15 millimicrons and a range of from 8 to 28 millimicrons. The ultimate particles are coalesced into agglomerates having an average size of three microns and a range of from 0.7 to 12 microns. When slurried in distilled water with ammonia at a pH of about 9 and vigorously agitated in an electric mixer such as a Waring Blendor, these agglomerates break up into smaller agglomerates and ultimate particles. The surface area of "Arc Silica" 800 is 185 square meters per gram. The weight loss at 120° C. is from 0.4 to 1.2 percent by weight and the ignition loss at 1,000° C. is from 1.0 to 3.8 percent by weight. The $SiO_2$ content of this material on an anhydrous basis is 99.6%, the sodium content is 47 p.p.m., the potassium content is 89 p.p.m. and the lithium content is 2 p.p.m.

Another silica suitable for the preparation of mixtures utilized in the methods of this invention is a very finely divided thermogenic silica product prepared by the burning of silicon tetrachloride. This product is supplied by the Cabot Corporation of Boston, Massachusetts under the tradename of "Cab-O-Sil" M5. This material has an average ultimate particle diameter of about 15 millimicrons. These particles are coalesced into agglomerates averaging 100 to 200 millimicrons in diameter. The specific surface area of this material is about 200 square meters per gram and the material is essentially free of sodium, potassium and lithium. Because this product is very light and bulky, it is less practical for large preparations than the preferred silica mentioned above.

Another suitable silica can be obtained by extensive ball milling of a 325 mesh amorphous silica material available from the Glasrock Products Company of Atlanta, Georiga under the tradename of "Glasrock." Ball milling of this material can be carried out in a vented steel mill with steel inserts and distilled water as a medium. Washing the product with acid and distilled water to remove any contaminating steel, peptizing the washed product with ammonia and extracting the fraction finer than 250 millimicrons by sedimentation yields silica having an average particle diameter of 35 millimicrons. This product is found to have a very heterogeneous particle size distribution, although substantially all particles are less than 50 millimicrons in diameter.

A silica source useful in the preparation of thermally decomposable mixtures is the effluent obtained by contacting a commercial dilute solution of an alkali metal silicate with an hydrogen ion exchange material until the alkali metal is essentially completely removed from the solution. The product obtained is an unstable solution of silicic acid which tends to form dimers, polymers and gels if allowed to stand for a period of from a few minutes to several hours, depending on the concentration of the solution. The solution is, therefore, used before gelation by diluting and mixing with boric oxide or a boric oxide source or is stablized for later use by adding to it a strong, volatile base such as tetramethylammonium hydroxide to a pH of about 12, to form tetramethylammonium silicate. When this solution is dried and heated, the tetramethylammonium hydroxide is eliminated along with the water.

The preferred boric oxide source is ammonium borate. For admixture with silica or a silica source, a solution of ammonium borate is prepared by suspending pure, sodium-free boric acid in distilled water and adding concentrated ammonia to the suspension with stirring until the boric acid dissolves completely. Other boric oxide sources are the aqueous solution of ammonium borate obtained by dissolving crystals of purified ammonium pentaborate or ammonium tetraborate in distilled water. Sodium-free boric acid is another boric oxide source which can be used. For optimum mixing with silica or a silica source the boric acid is previously dissolved in distilled water.

Boric oxide or boric acid can be pulverized or ball milled with amorphous silica to provide a very intimate mixture, which upon heating provides boric oxide and amorphous silica in an intimate mixture suitable for reaction to form borosilicate.

Process Conditions

The mixture of colloidally subdivided silica, or source thereof, and the boric oxide source compound is heated to evolve essentially all moisture and source decomposition by-products. This heating step eliminates moisture before a temperature is reached at which boric oxide would sublime due to the depression of sublimation temperature caused by moisture presence. When sources of boric oxide and silica are used it is preferable to use relatively slow heat-up rates of from about 50° to about 200° C. per hour below 500° C. to assure complete evolution of moisture vapors, ammonia and the like. Above 500° C. higher rates of heating of as much as 350° to 500° C. per hour can be conveniently used. More rapid heat-up rates may be employed where ball milled colloidally subdivided silica and boric oxide constitute the reaction mixture as there is less moisture present and no decomposition by-products to be evolved.

Low final temperatures between approximately 500° and 800° C. yield soft to gritty powders, whereas final temperatures between approximately 800° and 900° C. yield agglomerates which may readily be reduced to powder form by, for example, crushing in an agate mortar with an agate pestle. The powders formed within the 500° to 800° C. range can generally be screened directly. Moreover the resulting product is much less aggregated and generally can be used without the above crushing step if the silica/boric oxide mixture is disaggregated prior to heating to the final firing temperature. It will be understood that the demarcation temperatures in forming powders, 500° to 800° C., and in forming readily crushed agglomerates, 800° to 900° C., are approximate and will vary slightly as the boric oxide content is changed from 0.3 to 17% and the firing times are changed.

The time of thermal treatment will vary from one minute at the upper end of this range to as much as 200 hours at the lower end of this range. Of course, the higher the temperature the faster the reaction but the greater the tendency of the boric oxide to sublime. Also higher final temperatures necessitate shorter holding times to prevent fusion of the resulting borosilicate glass powders, but the shorter holding times result in less uniform heating and thus a less uniform composition. For these reasons it is generally preferred to operate the process at a final firing temperature within the range of 500° to 800° C.

Products formed utilizing this process are homogeneous borosilicate glass powders of controlled boron content, which powders are especially useful in isostatic hot pressing. The method of this invention is illustrated by the following additional examples in which all parts and percentages are by weight unless otherwise indicated.

EXAMPLE 1

A 100 gram quantity of "Arc Silica" 800, a colloidally subdivided, amorphous silica powder consisting of ultimate particles averaging 15 millimicrons in diameter coalesced into agglomerates having an average diameter of 3 microns, a specific surface area of 185 square meters per gram and containing essentially no sodium is slowly added to 900 milliliters of distilled water in the one-gallon stainless steel container of a Waring Blendor electric mixer operating at 10,000 r.p.m. After complete addition, operation of the mixer is continued for 1 minute. 19.7 Grams of boric acid dissolved in 150 milliliters of distilled water containing 10 milliliters of concentrated ammonia is slowly added to the silica suspension, while continuously agitating the contents of the blendor.

The resulting thick suspension is poured into a plastic tray and is allowed to dry overnight under an infrared lamp. The lumps obtained are transferred to a silica crucible and are heated in an electric furnace to 150° C. at a rate of 50° C. per hour. This temperature is maintained for two hours and heating is then resumed at a rate of 50° C. per hour to 900° C. This temperature is maintained for 24 hours. During the heating operation, water and ammonia are evolved. An electron micrograph of the mixture after heating to 150° C. shows a uniform mixture of the coalesced particles of colloidally subdivided silica and hydrated boric oxide. The conventional electron microscopic procedure for dry mounting of fine powders is used.

The lumps obtained after heating at 900° C. are crushed in an agate mortar with an agate pestle until all particles pass through a 20 mesh stainless steel screen. The powder thus obtained contains 42% silicon, 55% oxygen and 3% boron. No boric oxide can be removed from the powder by leaching with water at room temperature.

EXAMPLE 2

Example 1 is repeated substituting for the boric acid solution an ammonium tetraborate solution prepared by adding 1.89 grams of ammonium tetraborate tetrahydrate to 30 milliliters of distilled water at 60° C. and stirring until complete dissolution of the salt is obtained. 99 Grams of "Arc Silica" 800 are used.

The powder obtained after heating at 900° C. and pulverization in the same manner as in Example 1 contains 46.25% silicon, 0.36% boron and 53.45oxygen. No boric oxide can be removed from the powder by leaching with water at room temperature.

EXAMPLE 3

A 325 mesh amorphous silica powder available from the Glasrock Products Company, under the tradename "Glasrock," with a specific surface area of 2.5 square meters per gram and containing only 25 p.p.m. of sodium is ball milled for one week in a vented steel mill with steel balls using distilled water as the milling medium. The milled powder is washed first with hydrochloric acid and then water to remove any metal contamination from the mill. The powder is then peptized with ammonia and allowed to sediment to remove the fraction greater than 500 millimicrons. This fine fraction has a specific surface area of 77 square meters per gram which is equivalent to an average particle diameter of 35 millimicrons.

An 86 gram quantity of this colloidally subdivided silica is suspended in 900 milliliters of distilled water as described in Example 1. 24.9 Grams of boric acid and 15 milliliters of concentrated ammonium hydroxide in 200 milliliters of water are then added to the silica suspension with continuous vigorous agitation in the electric mixer. The resulting suspension is then dried as in Example 1.

Resulting lumps are transferred to a silica crucible. The mixture is heated in an electric furnace to 150° C. at a rate of 50° C. per hour. This temperature is maintained for 2 hours and the temperature is then raised to 900° C. at a rate of 200° C. per hour. This temperature is maintained for 12 hours.

The powder obtained after pulverization in the same manner as in Example 1 contains 40.1% silicon, 55.5% oxygen and 4.4% boron. No boric oxide can be removed by leaching with water at room temperature.

EXAMPLE 4

Example 1 is repeated substituting 4,300 grams of a 2 percent silicic acid effluent obtained by contacting a commercial dilute solution of an alkali metal silicate with an hydrogen ion exchange material until the alkali metal cations are essentially completely removed from the solution. The boric acid solution used in Example 1 is replaced by a solution of 24.9 grams of boric acid in 600 milliliters of water. The dried material is heated in an electric furnace to 150° C. at a rate of 50° C. per hour. This temperature is maintained for 2 hours and temperature is then raised to 700° C. at a rate of 350° C. per hour. This temperature is maintained for 1 hour. A fine powder containing 40% silicon, 56% oxygen and 4% boron is obtained directly and no pulverization is required.

EXAMPLE 5

Example 1 is repeated except that an 83 gram quantity of the "Arc Silica" 800 is used with 30.2 grams of boric acid and the final temperature is raised from 150° C. to 500° C. at a rate of 50° C. per hour and held at the maximum temperature for 100 hours.

The product is a friable borosilicate glass powder containing 83% $SiO_2$ and 17% $B_2O_3$.

What is claimed is:

1. A method of manufacturing borosilicate glass powder essentially free of alkali and alkaline earth metals consisting essentially of:
   a. intimately contacting colloidally subdivided amorphous silica or a thermally decomposable source thereof and a source of boric oxide selected from the group consisting of boric oxide, ammonium borate and boric acid to form an intimate mixture thereof, said mixture containing a silica equivalent of 83 to 99.7 parts by weight, a boric oxide equivalent of 0.3 to 17 parts by weight on a dry basis, and contains less than 0.05 percent by weight alkali and alkaline earth metals; and
   b. heating the mixture to a temperature from 500° to 800° C. to form powdered borosilicate glass.

2. The method of claim 1 wherein the source of boric oxide is ammonium borate.

3. A method of manufacturing borosilicate glass powder essentially free of alkali and alkaline earth metals consisting essentially of:
   a. intimately contacting colloidally subdivided amorphous silica or a thermally decomposable source thereof and a source of boric oxide selected from the group consisting of boric oxide, ammonium borate and boric acid to form an intimate mixture thereof, said mixture containing a silica equivalent of 83 to 99.7 parts by weight, a boric oxide equivalent of 0.3 to 17 parts by weight on a dry basis, and contains less than 0.05 percent by weight alkali and alkaline earth metals;
   b. heating the mixture to a temperature from 500° to 900° C. to form readily crushable borosilicate glass agglomerates; and
   c. crushing said borosilicate glass agglomerates to form powdered borosilicate glass.

4. The method of claim 3 wherein the heating temperature is from 800 to 900° C.

5. The method of claim 3 wherein the source of boric oxide is ammonium borate.

* * * * *